United States Patent [19]

Kearney

[11] 4,263,929

[45] Apr. 28, 1981

[54] ELECTROPNEUMATIC PRESSURE RELIEF INDICATOR

[76] Inventor: John G. Kearney, 2624 Hamilton Blvd., South Plainfield, N.J. 07080

[21] Appl. No.: 1,957

[22] Filed: Jan. 8, 1979

[51] Int. Cl.³ ............................................. F16K 17/40
[52] U.S. Cl. .................. 137/68 R; 220/89 A; 340/626; 137/557
[58] Field of Search ............ 137/68 R, 69–71, 137/557; 220/89 A; 340/626

[56] References Cited

U.S. PATENT DOCUMENTS

| | | | |
|---|---|---|---|
| 2,571,961 | 10/1951 | Smith | 220/89 A X |
| 2,788,794 | 4/1957 | Holinger | 220/89 A X |
| 2,895,492 | 7/1959 | Bell | 220/89 A X |
| 2,947,443 | 8/1960 | Sawyer et al. | 220/89 A |
| 3,304,546 | 2/1967 | Kern et al. | 340/611 X |

Primary Examiner—Arnold Rosenthal
Attorney, Agent, or Firm—Robert K. Youtie

[57] ABSTRACT

A pressure relief indicator including a housing connected in fluid communication with a fluid system to be relieved, a pair of rupturable diaphragms extending in closing relation across the housing and combining to define a closed chamber, the diaphragm adjacent to the system rupturing at a predetermined desired relief pressure and the other diaphragm rupturing at a lesser pressure, a pressure supply maintaining a control pressure in the chamber of a value between atmospheric pressure and the lesser diaphragm rupturing pressure, and an annunciator responsive to change in pressure differential between the chamber and atmosphere as upon rupture of the diaphragms.

6 Claims, 3 Drawing Figures

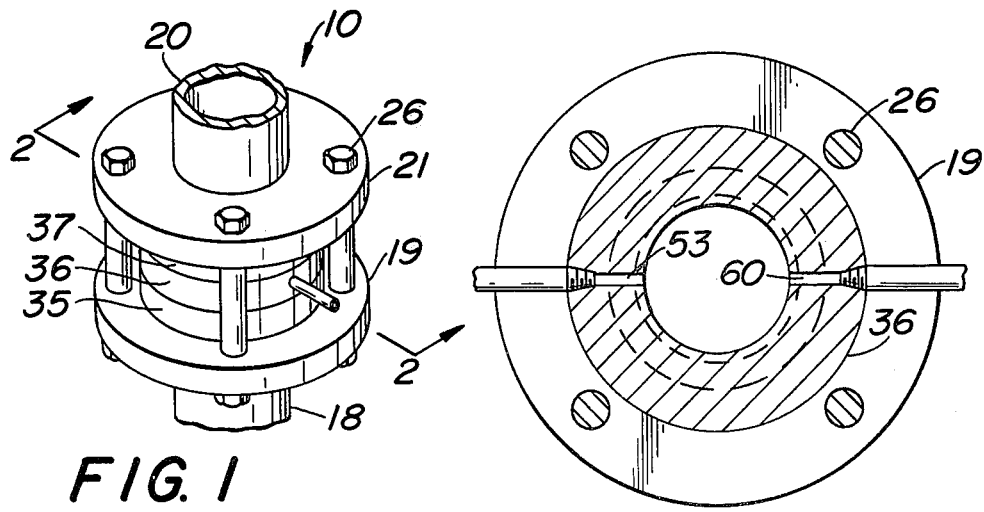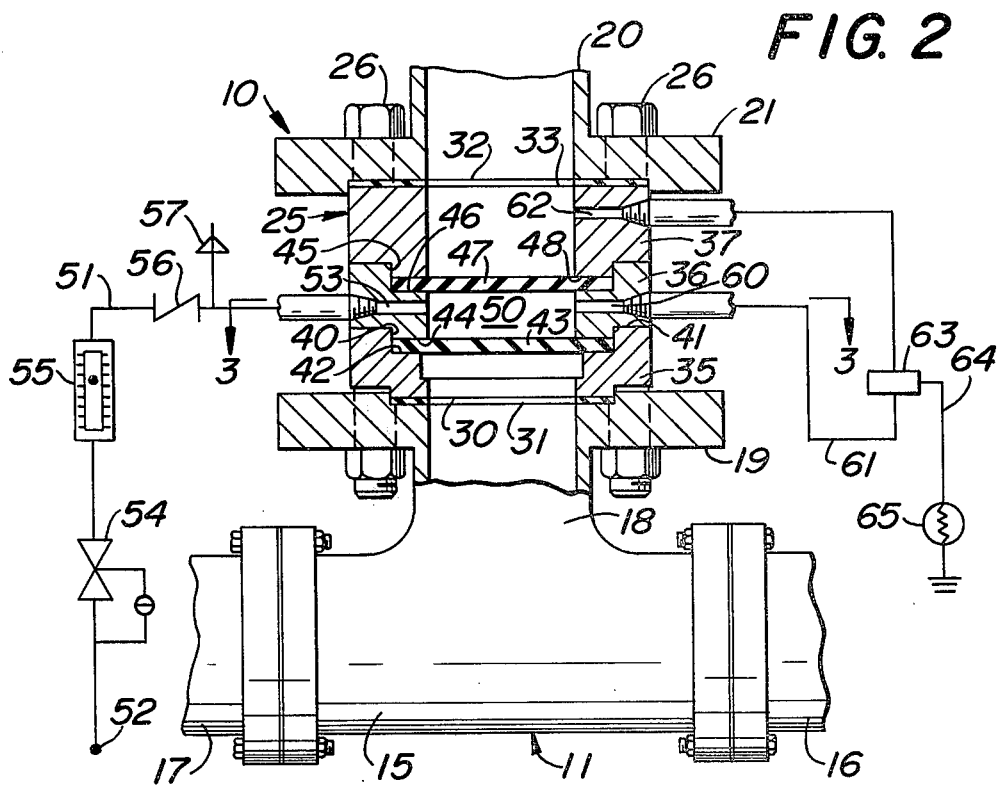

ELECTROPNEUMATIC PRESSURE RELIEF INDICATOR

BACKGROUND OF THE INVENTION

As is well known to those versed in the art, pressurized fluid systems are generally provided with suitable relief means, serving among other purposes that of localizing the relief of excess pressure for safety, convenience and obviating or minimizing economic loss. Toward this end, burst discs have been employed in conduits, vessels and other parts of pressure systems, which discs are calibrated for breakage or rupture under a predetermined fluid pressure. While the use of burst discs has proved satisfactory for pressure relief, there has not been found entirely satisfactory means for indicating the existence and location of a ruptured disc, consistent with safety as from electrical hazards, speed and reliability of indication, and economy in manufacture, installation and maintenance.

SUMMARY OF THE INVENTION

It is, therefore, an important object of the present invention to provide a pressure relief indicator device for use with burst discs, which is extremely simple in construction for economy in manufacture and installation, while being highly durable and entirely reliable throughout a long useful life.

It is a further object of the present invention to provide a burst disc indicator of the type described which is highly accurate for remote signal activation at any desired pressure, eliminates all electrical connections and wiring proximate to the burst disc location, is capable of indication with any panel board or alarm system at any location, can be pneumatically and electrically tested in position and without damage, and is adapted for installation and maintenance without special training.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

BRIEF DESCRIPTION OF THE DRAWINGS

FIG. 1 is a perspective view showing a burst disc indicator constructed in accordance with the teachings of the present invention.

FIG. 2 is a longitudinal section view taken generally along the line 2—2 of FIG. 1, showing the burst disc indicator assembled to a fluid system and diagrammatically indicating the pneumatic and electrical connections.

FIG. 3 is a transverse sectional view taken generally along the line 3—3 of FIG. 2.

DESCRIPTION OF THE PREFERRED EMBODIMENT

Referring now more particularly to the drawings, and specifically to FIG. 1 thereof, a pressure relief device or burst disc indicator of the present invention is there generally designated 10, and shown in FIG. 2 as applied to a fluid pressure system or conduit 11. It is appreciated that the pressure relief apparatus of the present invention may be applied at any desired location to a fluid pressure system, say to a pressure vessel, conduit or other, and the term "conduit" as employed herein and in the claims is intended to cover all component parts of a fluid pressure system to be protected.

The specific illustrated conduit, as shown in FIG. 2, may consititute a Tee section 15 interposed between pipe sections 16 and 17 and provided with an upstanding stem portion 18 including a flange 19.

Spaced over the flange 19 of stem 18 is a vent section or tube 20, generally aligned with the stem 18 and provided with a flange 21 spaced over the flange 19.

Interposed between the flanges 19 and 21 is a generally tubular housing 25 being secured therein by suitable means, such as a circular array of tie members or bolts 26 extending between the flanges 19 and 21 at spaced locations about the housing 25.

The housing 25 is generally tubular and open-ended, having its lower end 30 proximate to and in alignment with the flange 19 of stem 18, say with a sealing gasket 31 interposed in sealing engagement between the lower housing end 30 and the flange 19. An upper end gasket 32 may similarly interposed between the upper end 33 of tubular housing 25 and vent flange 21.

Further, the tubular housing 25 may advantageously be constituted of a plurality of generally annular sections 35, 36 and 37 superposed in aligned relation with respect to each other and with lower stem 18 and upper vent 20.

Annular section 35 is lowermost, and includes on its underside the annular surface 30 engaging sealing gasket 31. The upper side of lower section 35 is formed with annular recess 40 opening upwardly through the top annular surface 41 of the lower section and radially inwardly through the generally cylindrical internal surface of the lower section. Thus, the annular recess 40 defines an annular internal shoulder 42 facing generally upwardly. The upwardly facing annular surface or shoulder 42 of lower section 45 serves as a seat for supporting engagement with a lower or primary burst disc 43 which extends in closing relation entirely across the interior of lower housing section 35. The primary burst disc 43 is a rupturable diaphragm, advantageously of graphite, but possibly of other material, so sized and structured as to burst or rupture under a predetermined fluid pressure.

The intermediate annular housing section 36, immediately above and adjacent to the lower housing section 35 is generally axially aligned therewith and provided on its underside with an annular depending ridge or land 44 spaced from the exterior surface of the housing section 36 for entry into and bearing engagement with the peripheral margin of primary diaphragm 43 on the upper side thereof.

The upper side or end of intermediate housing section 36 is formed with an annular recess 45 opening upwaradly and radially inwardly to define an annular upwradly facing internal shoulder 46, similar to the shoulder 42 of lower housing section. The shoulder 46 is adapted to conformably seat a secondary rupturable diaphragm, disc or seal 47 which extends entirely across the interior of intermediate housing section 36 and closes the housing.

The upper annular housing section 37 is superposed in aligned relation with and over the intermediate housing section 36, and is provided on its underside with an annular depending peripheral rib 48 for seating engagement on the upper surface of the diaphragm 47 about the circumferential margin thereof.

It will now be appreciated that there is defined in the space between the diaphragms 43 and 47, and bounded within the intermediate housing section 36, a closed chamber 50.

The primary diaphragm 43 is calibrated for rupture at a fluid pressure desired to relieve the system 11; and, the diaphragm 47 is calibrated for rupture at a lesser fluid pressure than that of the primary diaphragm, so that its rupture is assured upon rupture of the primary diaphragm. In this manner the operation is fail-safe.

A fluid conduit 51 comunicates between a source of control fluid pressure or air, as at 52, and the interior of chamber 50, as through port 53. Interposed in the conduit 51 may be a fluid pressure regulator 54 adjacent to the fluid source 52, a flow indicator 55 downstream from the regulator, a valve 56, such as a check valve downstream from the flow indicator, and suitable bleed means 57 between the valve 56 and chamber 50. An additional port 60 may communicate through the intermediate housing section 36 between the interior of chamber 50 and the exterior thereof, for connection to a fluid conduit 61 which may connect at its other end through a port 62 to the interior of upper housing section 37 and communication therethrough to vent 20 and the atmosphere or environs. Interposed in the fluid line 61 may be a differential pressure sensitive device such as a normally open electric switch 63, which closes upon change in differential pressure sensed between the interior of chamber 50 and the vent 20. Suitable electric connection means, such as 64 may be associated with the switch 63 and an annunciator, signal or alarm, as at 65 for actuation of the latter upon closure of the switch 63. Of course, either or both of the switches 63 and annunciator 65 may be located remote from the housing 25, as desired, so that electrical connection to the switch and alarm provides no fire or explosion hazard. Of course, the switch 63 effectively closes the pressure conduit or line 61 while sensing or being responsive to fluid pressures in the line on opposite sides of the switch.

In operation, the pressure regulator 54 is selected so as to pass fluid through conduit 51 into chamber 50 to a predetermined pressure which is of a value between the rupture pressure of the secondary diaphragm 47 and the environmental, vent or atmospheric pressure communicated through port 62 to switch 63. In practice a differential pressue of 2" of water has been found satisfactory. The one-way check valve 56 prevents the transmission of even transient excessive pressure from the chamber 50 to the fluid source 52. If desired, the chamber 50 may be bled to reduce or eliminate the differential pressure applied to switch 63, in which case the switch should activate the annunciator 65, as for test purposes. Of course, it is understood that excessive pressure in the system 11 will rupture primary diaphragm 43 and immediately rupture secondary diaphragm 47, so that the change in differential pressure across switch 63 is sensed and promptly announced by indicator 65.

From the foregoing it is seen that the present invention provides a pressure relief indicator device which is relatively simple in construction, foolproof in operation, and otherwise fully accomplishes its intended objects.

Although the present invention has been described in some detail by way of illustration and example for purposes of clarity of understanding, it is understood that certain changes and modifications may be made within the spirit of the invention.

What is claimed is:

1. A device for pressure relief of a fluid conduit and relief indication without internal sensing of the conduit as well as for indicating malfunction of the device; comprising a tubular housing having one end connection in fluid communication with the conduit and the other end vented to atmosphere, a first diaphragm extending in closing relation across said housing adjacent to said one end thereof for closing the housing to fluid in said conduit, said first diaphragm rupturing under a predetermined limiting pressure communciated from said conduit, a second diaphragm extending in closing relation across said housing spaced from said first diaphragm in the direction away from said one housing end and combining with said first diaphragm and the intermediate housing portion to define a closed chamber, said second diaphragm rupturing under a second pressure less than said limiting pressure for venting said conduit to atmosphere through said housing responsive to conduit pressure exceeding said limiting pressure, a source of fluid pressure communicating with the interior of said chamber and having a value between said second pressure and vent pressure, differential pressure responsive means connected to said chamber and vent and responsive to change in differential pressure between said chamber and vent upon rupture of said diaphragms and/or leakage of said chamber, and indicator means connected to said differential pressure responsive means for indicating a change in said differential pressure and thereby sensing both pressure relief of said conduit without internal sensing of the conduit and leakage of said chamber.

2. A pressure relief according to claim 1, said differential pressure responsive means comprising an electric switch, and said indicator means comprising an electrical annunciator.

3. A pressure relief according to claim 2, said electrical switch being normally open in the absence of change of differential pressure between said closed chamber and vent.

4. A pressure relief according to claim 1, said other housing end being vented to the environment.

5. A pressure relief according to claim 1, said housing comprising at least three tubular sections secured together in serially aligned relation, said diaphragms being clamped between respective adjacent pairs of said tubular sections, and tie means securing said sections in said aligned diaphragm clamping relation.

6. A pressure relief according to claim 5, said diaphragms being fabricated of graphite.

* * * * *